United States Patent
Hanchett et al.

(10) Patent No.: US 10,143,220 B2
(45) Date of Patent: Dec. 4, 2018

(54) PET FOOD HAVING MODIFIED WAXY CASSAVA STARCH

(71) Applicant: CORN PRODUCTS DEVELOPMENT, INC., Jabaquara, Sao Paulo (BR)

(72) Inventors: Douglas J. Hanchett, Long Valley, NJ (US); Christina Odorisio, Bridgewater, NJ (US); Hanjoo Chae, Bridgewater, NJ (US)

(73) Assignee: Corn Products Development, Inc., Sao Paulo (BR)

( * ) Notice: Subject to any disclaimer, the term of this patent is extended or adjusted under 35 U.S.C. 154(b) by 0 days.

(21) Appl. No.: 15/330,964

(22) Filed: Jul. 1, 2015

(65) Prior Publication Data

US 2017/0332668 A1 Nov. 23, 2017

Related U.S. Application Data (60) Provisional application No. 62/037,840, filed on Aug. 15, 2014.

(51) Int. Cl.
*A23K 50/42* (2016.01)
*A23K 10/20* (2016.01)
*A23K 20/10* (2016.01)

(52) U.S. Cl.
CPC .............. *A23K 50/42* (2016.05); *A23K 10/20* (2016.05); *A23K 20/10* (2016.05)

(58) Field of Classification Search
CPC ......... A23K 50/42; A23K 10/20; A23K 20/10
See application file for complete search history.

(56) References Cited

U.S. PATENT DOCUMENTS

| 4,225,623 A | 9/1980 | Stussi |
| 4,229,489 A | 10/1980 | Chiu et al. |

(Continued)

FOREIGN PATENT DOCUMENTS

| EP | 1314743 A2 | 5/2003 |
| EP | 1566106 A1 | 9/2003 |

(Continued)

OTHER PUBLICATIONS

Sajilata M G, et al. "Specialy starches for snack foods", Carbohydrate Plymers, Applied Science Publishers, Ltd. Barking, GB., vol. 49, No. 2—Jan. 10, 2005, pp. 131-151.

(Continued)

*Primary Examiner* — Hoa V Le
(74) *Attorney, Agent, or Firm* — Jason Grauch; Jacqueline Cohen (57) ABSTRACT

A pet food composition comprising a meat based material comprised of meat or meat by-products, and an aqueous phase comprised of an acetyl-substituted waxy cassava inhibited starch in an amount effective to thicken said aqueous phase is provided. Also provided is a gravy for a pet food comprising an acetyl-substituted waxy cassava inhibited starch in an amount effective to thicken said composition and having a freeze/thaw stability greater than about 5 cycles as well as a method of feeding a canine or feline pet. Also provided is a gravy for a pet food comprised of a hydroxypropyl-substituted waxy cassava inhibited starch having less than about 2.5%, by weight of hydroxylpropyl substituents, in an amount effective to thicken said aqueous phase.

3 Claims, 2 Drawing Sheets

(56) References Cited

U.S. PATENT DOCUMENTS

| | | | |
|---|---|---|---|
| 4,341,809 | A | 7/1982 | Leshik et al. |
| 4,791,002 | A | 12/1988 | Baker et al. |
| 5,569,480 | A * | 10/1996 | De Coninck .......... A23G 3/346 |
| | | | 426/573 |
| 6,235,320 | B1 | 5/2001 | Daravingas et al. |
| 6,280,779 | B1 | 8/2001 | Nadeau et al. |
| 6,440,485 | B1 | 8/2002 | Cheuk et al. |
| 6,551,827 | B1 | 4/2003 | Visser et al. |
| 6,982,327 | B2 | 1/2006 | Visser et al. |
| 7,022,835 | B1 | 4/2006 | Visser et al. |
| 7,022,836 | B2 | 4/2006 | Visser et al. |
| 2003/0108649 | A1 | 6/2003 | Jeffcoat et al. |
| 2003/0207006 | A1 | 11/2003 | Jurgensen et al. |
| 2009/0148560 | A1 | 6/2009 | Shiba et al. |
| 2010/0034925 | A1 | 2/2010 | Pibarot et al. |
| 2010/0189843 | A1 | 7/2010 | Xie et al. |
| 2013/0022711 | A1 | 1/2013 | Ichihara et al. |
| 2017/0064978 | A1 * | 3/2017 | Hanchett ................ A23K 10/20 |

FOREIGN PATENT DOCUMENTS

| | | |
|---|---|---|
| EP | 1566196 A1 | 9/2003 |
| EP | 2014177 A1 | 1/2009 |
| GB | 1462884 | 5/1974 |
| JP | 2001000153 | 1/2009 |
| JP | 2009072135 | 4/2009 |
| JP | 2012254071 | 7/2011 |
| JP | 4880081 B1 | 2/2012 |
| WO | 2000001251 A1 | 1/2000 |
| WO | 2013076879 A1 | 5/2013 |

OTHER PUBLICATIONS

Sasikunya T., et al, Effects of Modified Tapioca Starch on the Stability of Fish Mince Gels Subjected to Multiple Freeze-Thawing; Journal of Muscle Foods, 21 (2010), pp. 299-416, Wiley Periodicals, Inc.

Fengyuan Sun, et al, Effects and Mechanism of Modified Starches on hte Gel Properties of Myofibrillar Protein From Grass Carp, International Journal of Biological Macromolecules, Dec. 1, 2013, pp. 17-24, Elsevier B.V.

Swinkels J J M "Composition and Properties of Commercial Native Starches", Starch: International Journal for the Investigation Processing and Use of Carbohydrates and Their Derivatives, Wiley-VCH Verlag, Weinheim, DE, vol. 37 No. 1, Jan. 1, 1985.

Chilean Search Report for CL 2274-15.

* cited by examiner

FIGURE 1

Universal Scale

| 0 | 5 | 10 | 15 |
|---|---|---|---|
| none | slight | moderate | strong |

Illustrative scale used for evaluating
syneresis (surface and pressed), gelling, graininess

FIGURE 2

PET FOOD HAVING MODIFIED WAXY CASSAVA STARCH

CROSS-REFERENCE

This application claims priority to U.S. Provisional Application Ser. No. 62/037,840, filed Aug. 15, 2014.

BACKGROUND OF THE INVENTION

Pets such as canines and felines have been fed "dry" and "wet" diets for many years. "Wet" diets are generally packaged in a can-like container. They are "wet" in appearance because of the moisture therein. Generally two types of wet diets are presently prepared. One is usually referred to in the industry as ground loaf. This is generally prepared by contacting all the key components such as the meat together with water and then heating and mixing together in a series of apparatuses, or one apparatus, such as a thermal screw cooker/mixer. In this manner all of the major components as well as the minor components such as colorants, oils, vitamins, and vitamin-like materials are combined at an early preprocessing step and all processed together. Following this procedure an essentially homogeneous, intracellular honeycomb-type (hence "ground loaf") mass is produced which is readily packaged into a cylindrical container.

A second wet diet is generally referred to in the industry as "chunk and gravy". An example of this diet is described in U.S. Pat. No. 4,791,002 (Baker et al.) This wet diet is usually produced by grinding meat, mixing, emulsifying, and then mixing the meat further with water, oil and grains and other materials if desired. This mixture is then fed into a cooking apparatus, emitted therefrom, cut, cooled and then sent for various stage fills. Usually in a two-stage fill, a gravy is added to the chunk. The gravy is prepared in the usual manner, for example, by mixing grains, modified starches, water, vitamins, if desired, and other materials into a mixing tank wherein it is heated and then fed to the container holding the chunky materials. As opposed to the ground loaf, this diet has physically separated, discrete chunks-pieces of the ground meat and grains as prepared. These discrete particles are present in the gravy-type liquid in the final container. The product produced by "chunks and gravy" process has been used in pet food for many years.

In the manufacturing of canned pet foods, specifically the gravy, highly hydroxypropylated waxy corn starches are often used to provide retrogradation stability and textural quality to the final product. This starch must also withstand high temperature retort processing. However pet food manufacturers have indicated that high hydroxypropylated distarch phosphate starches in the pet food grade often causes the pets some degree of gastric intolerance, resulting in a higher likelihood of loose stool. Thus, there is a need for alternatively modified starches that remained unmet until this invention.

SUMMARY OF THE INVENTION

In one aspect, pet food composition comprising a meat based material comprised of meat or meat by-products, and an aqueous phase comprised of an acetyl-substituted waxy cassava inhibited starch in an amount effective to thicken said aqueous phase.

In another aspect, this invention relates to a gravy for pet food comprising an acetyl-substituted waxy cassava inhibited starch in an amount effective to thicken said composition and having a freeze/thaw stability greater than about 5 cycles.

In another aspect, this invention relates to a method of feeding a canine or feline pet comprising feeding a canine or feline pet a composition comprising a gravy for pet food comprising an acetyl-substituted waxy cassava inhibited starch in an amount effective to thicken said composition and having a freeze/thaw stability greater than about 5 cycles.

In yet another aspect, this invention relates to the above compositions and methods wherein a hydroxypropyl-substituted waxy cassava inhibited starch having a hydroxypropyl content of less than about 2.5% is used as the thickener in place of, or in addition to the acetyl-substituted waxy cassava inhibited starch.

DETAILED DESCRIPTION OF THE INVENTION

Chunk and Gravy pet food products generally comprise a preformed meat particle prepared by making a meat emulsion which is extruded and formed by physical pressure or thermal energy such as cooking with steam, cooking in water, oven dry heat and the like. A product, cooked meat, is diced into chunks, which are eventually mixed with a gravy or sauce thickened by a starch. The two components are then filled into a container, usually a can, seamed and sterilized. While the invention will be described below in relation to the chunk and gravy product and preparation described in U.S. Pat. No. 4,791,002, the acetyl substituted waxy cassava distarch adipates described in more detail below will be useful as thickeners for the gravy of other chunk and gravy pet foods. For example, U.S. Pat. No. 4,247,562 (Bernotavicz), the disclosure of which is incorporated by reference herein, discloses a moist pet food having a fluid gravy system and is used as a top dressing for a dry dog food, or as a stand-alone pet food.

The chunk and gravy pet food product can be prepared as described in U.S. Pat. No. 4,791,002, the disclosure of which is incorporated by reference. The chunk and gravy pet food of U.S. Pat. No. 4,791,002 is typically a nutritionally-balanced, highly-palatable and visually-appealing canned pet food comprising: (a) meaty pieces having a fat content of greater than 2%, a content of at least 75% meat-derived ingredients, and sufficient soybean flour and blood plasma to provide resilience and bind the fat; in (b) a transparent, free-flowing gravy which is substantially free of visible fat.

In one aspect, the meaty pieces have a fat content of from 2 to 16%, and comprise from 3 to 10% defatted soybean flour, from 2 to 12% dry blood plasma and at least 75% meat-derived ingredients including from 15 to 40% liver, wherein the combined weight of liver, soybean flour and dry blood plasma is at least 30% of the weight of the meaty pieces.

The process typically comprises: (a) preparing a slurry comprising soybean flour, dry blood plasma, liver, and other ingredients as necessary to achieve a total fat content of at least 6% and a total meat content of at least 75%; (b) subjecting the slurry to agitation and cutting sufficient to produce a fine meat emulsion; (c) forming a sheet of emulsion; (d) heating the sheet of emulsion to an internal temperature of at least 170° F.; (e) cutting the sheet into discrete meaty pieces; (f) feeding said meaty pieces and a free-flowing gravy into a can; and (g) closing and retorting said can.

In one embodiment, the typical process enables the preparation of a canned, nutritionally-balanced pet food comprising a major amount of resilient meaty pieces having a content of meat-derived ingredients of at least 75% and a fat content of from 2 to 16%, and a minor amount of a transparent free-flowing gravy which coats the meaty slices to provide a high sheen, and in its more typical aspects the process comprises: (a) preparing a slurry comprising from 3 to 10% soybean flour, from 2 to 12% dry blood plasma, from 15 to 40% liver, and other ingredients necessary to prepare a cohesive, resilient meaty portion which is capable, upon further processing, of high speed cutting into cleanly cut slices with a minimum of fines, the combined weight of soybean flour, dry blood plasma and liver comprising at least 30% of the weight of the slurry; (b) subjecting the slurry to agitation and cutting sufficient to produce a fine emulsion having a density of greater than 55 pounds per cubic foot; (c) forming a sheet of emulsion on a continuously moving band; (d) passing said band and the sheet of emulsion thereon through steam heating means for a time sufficient to heat the sheet to an internal temperature of at least 170° F., said steam heating means comprising at least two chambers supplied with steam, including a lower chamber positioned under said band which directs steam onto the underside of said band, and an upper chamber positioned above said band with a source of steam located centrally within said upper chamber defined by walls confining the steam on all sides except for an open bottom which permits contact of steam with said sheet and narrow gaps between the sheet and entrance and exit end walls through which steam is permitted to exit, such that if the thickness of said sheet increases, the velocity of steam over said sheet also increases, thereby bringing more steam into direct contact with said sheet and increasing the heat supplied to said sheet; (e) slitting the sheet along a plurality of lines parallel to its direction of movement to produce a plurality of meaty strips; (f) slicing the strips transversely of their long axes to produce thin meaty slices with a minimum of fines and broken or ragged pieces; (g) preparing said gravy by heating a mixture comprising acetyl substituted waxy cassava distarch adipate and water in amounts sufficient to provide, after retorting and cooling, a gravy which is free-flowing from a can and coats the meaty slices to provide a high sheen; (h) filling cans with said meaty slices and gravy; and (i) retorting the cans. This invention is not limited to the pet foods prepared by the above process, nor to any particular type of meat chunks or process of their preparation.

Nutritionally-balanced foods will contain protein, carbohydrates, fats, vitamins and minerals in amounts established by feeding tests to be sufficient for proper growth and maintenance.

A typical product of the invention will meet the nutritional requirements as set forth in Nutrient Requirement of Dogs, revised 1985, which is published by the National Research Council of the National Academy of Sciences.

By the term "pet food" is meant any sealed, packaged pet food which has been subjected to sterilization, e.g. retorting in cans with steam at high temperature, for preservation. It will thus be apparent to those skilled in the art that the term "canned" in this context is broader than metal cans, and includes molded or unmolded containers of one or more polymeric, foil (including laminates), or other packaging materials (e.g., for pouches), as well as glass jars and the like. Aseptic packaging techniques can be used for containers other than metal cans.

The pet food product typically has a meat content of greater than 75%, and more typically 80 to 85%, in the meaty pieces. Included within the term meat are those meat-derived ingredients defined as "meat" and "meat by-products" as defined by the current Definitions of Feed Ingredients published by the Association of American Feed Control Officials, Incorporated. As defined, the term "meat" includes not only the flesh of cattle, swine, sheep and goats, but also other mammals, poultry and fish. The term "meat by-products" is defined to include non-rendered parts of the carcass of slaughtered animals, poultry and the like. Typical meaty materials include beef and pork liver, beef, whole chicken, chicken parts, beef and pork lungs, beef and pork spleen, turkey and other meat and meat by-products.

The overall combination of meats affects product texture, integrity and flavor. It has been determined that liver is an important ingredient in terms of texture due to its ability to form a cohesive, heat-set meaty material which resists leaching of fat and gel-able protein into the gravy when used at a level of at least 10% by weight of the meaty pieces along with soybean flour and blood plasma. Levels of over above 40% on this same basis are, however, less desirable because they tend to depress overall palatability.

The meat-derived ingredients are typically ground prior to mixing with dry and liquid ingredients in a meat grinder. At this stage, the meat-derived ingredients which can be supplied in frozen form are finely ground, typically at near freezing temperatures. Fine grinding at this stage, e.g., through a ⅛ to ¼ inch plate, improves mixing with dry ingredients and subsequent emulsification.

The ground meat-derived ingredients are fed to a mixer where other ingredients of the meaty pieces are added and mixed to form a slurry. The high meat content of the pieces permits the addition of only up to about 25% by weight of other materials which will, of necessity, include dry binding ingredients and water sufficient to hydrate these binding ingredients if the moisture content of the meat-derived ingredients is not adequate.

Soybean flour and dry blood plasma will be effective in combination with liver in the formula, to prevent leaching of fat and gel-able proteins into the gravy during retorting. Other heat settable proteinaceous binders, for example soy and cottonseed protein isolates and concentrates, also effective to prevent leaching of fat and gel-able proteins into the gravy can be employed in addition to or in place of the soybean flour and blood plasma. These materials will be employed at levels effective, in the formula, to provide this desired result. Typical formulations will contain from 3 to 10% soybean flour and from 2 to 12% dry blood plasma, in combination with at least 15%, more typically at least 20%, liver. Desirably, the combined weigh of these three binding materials will be at least 25%, typically at least 30%, and most typically from 35 to 50%, based on the weight of the meaty pieces. Meaty pieces having the desired properties can be formed without the use of farinaceous ingredients, polysaccharide gum binders or inert fillers, and typically the meaty pieces are substantially, if not completely, free of such.

Up to about 8% free fat, such as choice white grease, tallow or lard, can be added in addition to the natural fat content of the meat for nutritional or palatability improvement without permitting substantial free fat to be visible in the gravy after retorting. The National Research Council recommends a fat content of at least 5% on a dry basis. Thus, for the high moisture product of this invention, a total fat content of the meaty pieces should be at least about 2% and will typically be up to about 16%, based on the weight of the pieces. A more typical range is from about 6 to about 12% fat. If free fat is added, it is typically heated sufficiently to liquefy it prior to addition.

In addition to the other ingredients, various minor ingredients such as nutritional supplements, coloring agents, antioxidants, and the like, will be added and mixed with the other ingredients sufficiently to provide a uniform slurry, say on the order of from 5 to 20 minutes. The moisture content of the slurry will typically be from 55 to 65%, typically from 58 to 62% by weight, and will have a density of about 66 pounds per cubic foot.

The slurry, while being uniform, finely-ground and suitable for the preparation of pet foods other than one which must form well-defined, sliced pieces that must also survive retorting without loss of significant fat or gel-able protein to the gravy must be subjected to further agitation and cutting to form an emulsion. The slurry is therefore pumped from a mixer to an emulsifying device, still at a temperature just below about freezing. In one representative type of emulsifying device, the slurry is advanced by a screw conveyor and forced through a series of knives and cutting plates. The emulsifying device imparts significant mechanical work to the slurry, raising its temperature by, for example, as much as 25° F., typically about 15° F., by the time it exits the emulsifier, typically as a fine creamy emulsion. The emulsion should have a density above 55, typically above 60, pounds per cubic foot or unsightly pieces, ragged cutting, broken pieces, and excess fines may result. More typical densities range from about 61 to 66 pounds per cubic foot.

The emulsion is then formed into a sheet of emulsion and heated to an internal temperature of at least 170° F. to assure sufficient heat setting of the formulation to prevent significant fat or gel-able protein to be leached during retorting and to enable slicing to obtain clean cut corners with a minimum of fines and broken pieces. The exact temperature may vary and will typically be within the range of from 172° F. to about 190° F., more typically about 180° F. and above.

The exact means for shaping the sheet of meaty material and heating are not critical, but these operations should be conducted so that the final product is of highly uniform appearance and integrity. U.S. Pat. No. 4,791,002 describes this step in detail. Following heating, the resulting sheet of meaty material is sliced, i.e., cut, into appropriately-sized pieces for a canned meat and gravy pet food product. Typical sliced pieces will be dices of square or rectangular shape, or thin slices of from about 5 to about 6 millimeters in thickness. The preparation of the thin slices of uniform size and with clean cuts and a minimum of fines are especially difficult, and the process of the invention provides especially good results.

A gravy component is prepared for canning with the meat pieces. The gravy will comprise at least a thickening amount of an inhibited waxy cassava starch. In certain embodiments, the inhibited waxy cassava starch will be a waxy cassava acetyl-substituted distarch adipate ("waxy cassava ASDA"), and optionally vegetable or other gums, or the like, and water. It may also contain a sugar (e.g. sucrose, dextrose, fructose), a corn syrup, a high-fructose corn syrup, a maltodextrin, salt, color, flavors (e.g., a hydrolyzed vegetable protein having a meaty flavor), minor nutrients or the like. Typically, a mixture of from about 1% to about 10% by weight, typically from about 2% to about 7%, of the waxy cassava ASDA, from about 2% to about 7% by weight of a sugar, and water is heated to provide a gravy that can be applied applied to the meaty pieces to form a pet food.

In one embodiment, the only thickener used in the gravy is the waxy cassava ASDA.

Acetyl-substituted waxy cassava distarch adipates that are typically useful in the process and compositions of the invention are described in detail in EP 1314743A2 (Jeffcoat et al.), the disclosure of which is incorporated by reference herein. Waxy cassava starches, also known as low amylase tapioca starches (regionally cassava and tapioca may also be known as manioc, manioca, yucca, or mandioc), may be obtained by the method of U.S. Pat. Nos. 7,022,836; 6,551,827; and 6,982,327 (Visser et al.), herein incorporated in their entirety by reference. Also included in this invention are low amylase tapioca starches derived from low amylase cassava plants which may now be found in nature, obtained by standard breeding and crossbreeding technique (i.e. non-GMO), or obtained by translocation, inversion, transformation or any other method of gene or chromosome engineering to include variations thereof, whereby the properties of the starch of this invention are obtained. In addition, starch extracted from a plant grown from artificial mutations and variations of the above generic composition which may be produced by known standard methods of mutation breeding is also applicable herein. By "waxy cassava" is meant a starch which has an amylase content substantially lower than that of regular tapioca starch, particularly less than about 10%, more particularly less than about 5%, and most particularly less than about 3% amylose by weight.

The native waxy cassava starch is cross-linked using mixed adipic and acetic anhydride reagents. Such reagents and the crosslinking reaction are well known in the art for making distarch adipates using other native starches. Distarch adipates, prepared by crosslinking with mixed adipic and acetic anhydride reagents, and the methods of producing them are also known in the art. The mixed anhydride reagent used creates organic ester linkages that are relatively stable under many typical processing conditions. See for example U.S. Pat. No. 2,461,139 (Caldwell).

For example, the waxy cassava distarch adipates may be prepared by reacting starch in an aqueous slurry with an adipic/acetic mixed anhydride reagent. The bound acetyl of the resultant starch may be adjusted by one skilled in the art to any level necessary for the amount of stability desired, particularly in the range of up to about 2.5% bound acetyl of the waxy cassava inhibited starch. The amount of adipic/acetic mixed anhydride used in the reaction may also be adjusted by one skilled in the art to provide the desired inhibition effect (degree of crosslinking) in the resultant starch. Typically, the amount of mixed anhydride used is less than about 1%. Up to 4% acetic anhydride may be used for stabilization (mono-substitution) to provide maximum stability. This typically yields about 2.5% bound acetyl. One of ordinary skill will be able to routinely adjust reaction efficiency of the acetylation process one employs based on the amount of acetic anhydride used. The bound acetyl of the waxy cassava inhibited starch will typically range from 0.1%, more typically 0.25% to just less than about 2.5% by weight, more typically from about 0.5% to about to about 2%, and even more typically from about 1% to just less than about 2%.

As an alternative to adipic cross-linking, other food-acceptable chemical cross-linkers can be used. Examples of other chemical cross-linkers include other linear dicarboxylic acid anhydrides, citric acid, phosphorus oxychloride, and trimetaphosphate salts. The amount of cross-linking agent necessary to give a suitable product will depend upon the desired functionality of the starch. Methods to obtain such functionality by crosslinking are well known in the art and will vary depending, inter alia, on the type of cross-linking agent employed, the concentration of the cross-linking agent, the reaction conditions, and the necessity for having a cross-linked starch. Typically, this amount will range from about 0.001 to about 10.0% by weight of the starch. The typical range for adipate cross-linking will use from about 0.05 to about 2% by weight adipate, more typically from about 0.2% to about 1.75%, and even more typically from about 0.5% to about 1.5%. From these ranges, the corresponding amounts of other cross-linking agents to obtain equal levels of inhibition can be determined by one of ordinary skill without undue experimentation based on actual and observed cross-linking efficiencies.

As an alternative to chemical cross-linking or in addition to chemical cross-linking, the waxy cassava acetyl-substituted starches can be physically (e.g. thermally) inhibited, before or after acetylation and/or cross-linking. An example of the methods of thermal inhibition that will be useful are found in U.S. Pat. No. 6,261,376 (Jeffcoat, et al.), the disclosure of which is incorporated herein by reference in its entirety.

The thermal inhibition process of the '376 patent comprises the steps of (a) optionally pH adjusting a granular starch to a pH of about 7.0 or above; (b) dehydrating the starch until it is anhydrous or substantially anhydrous; and (c) heat treating the dehydrated starch or flour at a temperature and for a period of time sufficient to inhibit, the starch or flour and preferably render it non-cohesive. As used herein, "substantially anhydrous" means containing less than 1% moisture by weight.

Typically, the granular starch is slurried in water, optionally the pH is adjusted to neutral or greater by the addition of a base, and the starch is dried to about 2-15% moisture. The dried granular starch is then thermally inhibited by dehydrating the starch to anhydrous or substantially anhydrous and then heat treating the dehydrated starch. The resulting granular thermally-inhibited starch is then acetylated as described herein and, optionally further inhibited by cross-linking.

The dehydration may be a thermal dehydration or a non-thermal dehydration. The thermal dehydration is carried out by heating the starch in a convention oven or a microwave oven, or any other heating device for a time and at a temperature sufficient to reduce the moisture content to less than 1%, preferably 0%. Examples of non-thermal dehydrating methods include extracting the water from the granular starch using a hydrophilic solvent such as an alcohol (e.g., ethanol) or freeze drying the starch.

The typical pH is at least 7, most typically greater than pH 8, more typically pH 7.5-10.5, and even more typically 8-9.5. At a pH above 12, gelatinization more easily occurs; therefore, pH adjustments below 12 are more effectual.

Buffers, such as sodium phosphate, may be use to maintain pH if needed. An alternative method of raising the pH consists of spraying a solution of a base onto a granular or pregelatinized starch until the starch attains the desired pH, either during or prior to the thermal inhibition steps. If the starch is not going to be used in a food, any suitable inorganic or organic base can be used to raise the pH of starch. Another method consists of infusing etc. It should be noted that the textural and viscosity benefits of the thermal inhibition process tend to be enhanced as the pH is increased, although higher pHs tend to increase browning of the starch during the heat treating step.

As an alternative to acetyl substitution, the waxy cassava starch can be hydroxypropylated with less than about 2.5%, typically from about 0.1% to about 2%, and more typically from about 0.5% to about 1.5%, by weight of propylene oxide, to form a hydroxyl-propyl substituted waxy cassava inhibited starch.

In one embodiment, the gravy produced using a waxy cassava ASDA as the sole thickener will exhibit stability over at least 5 freeze/thaw cycles, as that test is described in detail below.

The meaty pieces and gravy can be canned and retorted in a conventional manner to provide a canned meat and gravy pet food. The meaty pieces will typically comprise at least 45%, and typically a major portion of the canned product, with the gravy forming a minor portion, by weight. Typically, the product will comprise from 50 to 60% by weight of meaty pieces. Retorting will be under conditions effective to preserve the canned product, e.g. by steam retorting, or other sterilization by the use of heat.

In another aspect, this invention relates to a method of feeding a canine or feline pet. The diet of the canine or feline will also include other nutritionally-balanced foods and will contain protein, carbohydrates, fats, vitamins and minerals in amounts established by feeding tests to be sufficient for proper growth and maintenance.

The invention will now be illustrated by the following examples, which should be construed to limit the invention. All parts and percentages in this specification and claims are by weight unless otherwise indication in context.

EXAMPLES

Acetyl-Substituted Distarch Adipate Preparation 100 grams of waxy cassava starch is slurried in 150 grams water and brought to a temperature of 27° C. The pH of the slurry is then adjusted to 8.0 using a 3% NaOH solution. The reagent is mixed in a separate flask using 3.9% (wt/wt) acetic anhydride and 0.9% (wt/wt) of a 1:9 adipic:acetic mixed anhydride based on the weight of the starch. This mixture is then added to the starch slurry at a controlled rate during which the pH is kept constant at pH 8.0 until the reaction is complete. The pH is then adjusted to 6.0 using a dilute HCl solution and the starch was washed and dried. The procedure can be adjusted by one of ordinary skill in the art to achieve a bound acetyl levels of up to about 2.5% bound acetyl, for example 2.0%, 1.5%, 1.0% and 0.50%.

Example 1

Sliced Beef Dinner Formula and Preparation

Figure 2:
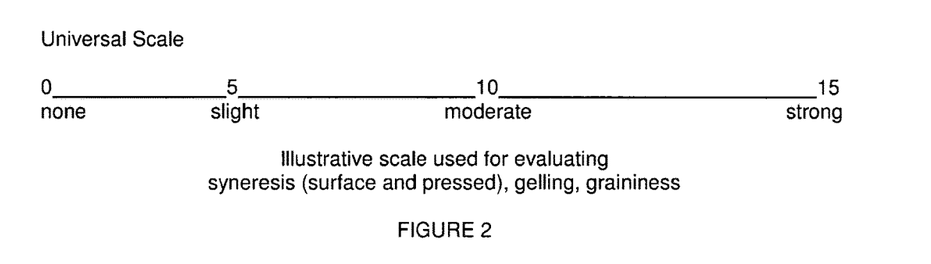
FIG. 2 depicts an illustrative universal scale for evaluating syneresis (surface and pressed), gelling, graininess of samples.

Blocks of frozen meat and meat by-products (beef, liver, lungs and spleens) are tempered overnight. The tempered meats are ground through an Autio grinder equipped with ³⁄₁₆" hole grind plate. These meats are mixed with dry and liquid ingredients in the proportion outlined in Table I. Mixing is performed in a Patterson twin-shafted mixer for 15 minutes. The blend is emulsified through a Karl Schnell emulsifier equipped with dual cutting plates, the first plate having 3.0 mm holes and the second having 1.7 mm holes. The resulting fine emulsion is transferred to a Hutt DP form press. The form press produces a 9.3 mm thick×280 mm wide emulsion sheet at the rate of 280 lb./hr. This sheet is passed through a steam tunnel, similar to that depicted in FIG. 2, with a residence time of two minutes. Temperature of raw emulsion entering the steam tunnel is 59°-68° F. and it is raised to 176° F.-181° F. at the steam tunnel discharge. The cooked, firm sheet is sliced with the slitter knives spaced 25 mm apart.

The newly formed strips are guillotine cut about 5.5 mm long. The slice dimensions after guillotine cut are 24.5 mm.times.10.7-12.4 mm.times.5.5 mm. These slices are filled into cans with a Solbern filler. A gravy is prepared according to formula given in Table I and is heated in a jacketed kettle. The hot gravy is added to the slices via an FMC piston filler with 52% by wt. beef slices and 48% by wt. gravy. The filled 307×111 cans are retorted in a still retort. The example can be successively repeated using each of waxy cassava acetyl-substituted distarch adipates having 2.0%, 1.5%, 1.0%, 0.50%, and 0.25% bound acetyl.

TABLE I

| Ingredient | Beef Slices Weight % | Gravy Weight % |
| --- | --- | --- |
| Water | 1 | 90 |
| Beef | 40 | 0 |
| Beef Lungs | 20 | 0 |
| Pork Liver | 20 | 0 |
| Beef Spleen | 13 | 0 |
| Soybean Flour, Defatted | 7 | 0 |
| Sugar | 0 | 5 |
| Powdered Blood Plasma | 4.5 | 0 |
| Modified Waxy Cassava Starch[1] | 0 | 4 |
| Animal Fat | 2 | 0 |
| Salt (NaCl) | 1 | 0.5 |
| Dicalcium Phosphate | 1 | 0 |
| Color | 0 | 0.5 |
| Vitamins, Minerals and Antioxidant | 0.5 | 0.5 |
| Total | 100 | 100 |

[1]Acetyl-substituted Distarch Adipate of Example 2 of EP 1314743A2

Example 2

Diced Chicken Formula and Preparation

The formula outlined in Table II is used to produce a canned dog food containing chicken-flavored dices in gravy. The meat emulsion is prepared using the procedure outlined in Example 1. The emulsion is extruded through a Hutt DP form press equipped with a die block which has a plurality of rectangular openings of 8 mm.times.8 mm cross-section. Emulsion strip-shaped sheets exit this die. The average gap between two adjacent strips is 5.4 mm. The emulsion strips are cooked in the steam tunnel for about one minute which results in a 185° F. product temperature at the tunnel exit. The cooked strips are guillotine cut to 12.5 mm length. The dice dimensions after guillotining are 12.5 mm long×9.0 mm wide.times.8.6 mm thick. These dices are canned in an amount of 52 wt. % are canned along with an amount of 42 wt. % of 195° F. gravy (composition outlined in Table II) in 307×111 cans. The cans are retorted in a still retort. The resultant product has tan color chicken dices immersed in light gravy. The example can be successively repeated using each of acetyl-substituted waxy cassava distarch adipates having 2.0%, 1.5%, 1.0%, 0.50%, and 0.25% bound acetyl.

TABLE II

| Ingredient | Chicken Dices Weight % | Gravy Weight % |
| --- | --- | --- |
| Water | 1 | 90 |
| Pork Liver | 40 | 0 |
| Chicken Parts | 16 | 0 |
| Whole Chicken | 16 | 0 |
| Beef Lungs | 12 | 0 |
| Soybean Flour, Defatted | 6 | 0 |
| Sugar | 0 | 5 |
| Powdered Blood Plasma | 5 | 0 |
| Modified Waxy Cassava Starch[1] | 0 | 4 |
| Animal Fat | 1 | 0 |
| Salt (NaCl) | 1 | 0.5 |
| Dicalcium Phosphate | 1 | 0 |
| Caramel Color (Liquid) | 0 | 0.5 |
| Color, Vitamins, Minerals and Antioxidant | 1 | 0 |
| Total | 100 | 100 |

[1]Acetyl-substituted Distarch Adipate of Example 2 of EP 1314743A2

Example 3

Alternative Gravy Formulation in Canned Meat Chunk and Gravy Pet Food

An alternative gravy formulation can be made as set forth below.

| Ingredient | % |
| --- | --- |
| Water | 87.0 |
| Modified Waxy Cassava Starch[1] | 4.00 |
| Chicken flavor | 1.00 |
| Salt | 2.0 |
| Brown color | 1.0 |
| Potassium chloride | Recommended |
| Calcium phosphate | level (total 5.0%) |
| Zinc sulfate | |
| Choline chloride | |
| Vitamin E, Vitamin B12, Vitamin D3, | |
| Vitamin A | |
| Niacin | |
| Copper sulfate | |
| Thiamine mononitrate | |
| Manganese sulfate | |
| Folic acid | |
| Biotin | |
| Other mineral sources | |
| TOTAL | 100.00 |

[1]Acetyl substituted Distarch Adipate of Example 2 of EP 1314743A2

Preparation:

Add chicken flavor, salt, color and preblend of nutrients into water and dissolve completely.

Add starch into the mixture and agitate until uniformly dispersed.

Heat the above final mixture at 170-180 F for 5-10 mins (depending on nature of starch).

Transfer to holding tank.

Fill into can (two shot filling process), or combine with meat chunk in a service tank, then fill into can.

Retort the can at 255-265 F for 45-90 mins (depending on requirement).

Cool to room temperature.

Example 4

Chicken Gravy for Single Pouch Pet Food

An alternative gravy formulation can be made as set forth below.

| Ingredient | % |
|---|---|
| Water | 40 |
| Chicken broth | 47 |
| Modified Waxy Cassava Starch[1] | 4.00 |
| Chicken flavor | 1.00 |
| Salt | 2.0 |
| Brown color | 1.0 |
| Potassium chloride | Recommended |
| Calcium phosphate | level (total 5.0%) |
| Zinc sulfate | |
| Choline chloride | |
| Vitamin E, Vitamin B12, Vitamin D3, | |
| Vitamin A | |
| Niacin | |
| Copper sulfate | |
| Thiamine mononitrate | |
| Manganese sulfate | |
| Folic acid | |
| Biotin | |
| Other mineral sources | |
| TOTAL | 100.00 |

[1]Acetyl substituted Distarch Adipate of Example 2 of EP 1314743A2

Preparation:
Add chicken broth to water.
Add chicken flavor, salt, color and preblend of nutrients into water and dissolve completely.
Add starch into the mixture and agitate until uniformly dispersed.
Heat the above final mixture at 190-195 F for 10-15 mins (depending on nature of starch).
Transfer to holding tank.
Fill into pouch

Example 5

A series of cream sauces were made and tested as set forth below.

Cream Sauce Formula:

| Ingredient | wt % | gm |
|---|---|---|
| Water | 78.3 | 1174.5 |
| Whipping Cream | 15 | 225 |
| Starch | 4.6 | 67.5 |
| Sugar | 0.71 | 10.65 |
| Salt | 0.7 | 10.5 |
| Onion Powder | 0.25 | 3.75 |
| Lecithin (Solec F, Solae Co) | 0.5 | 7.5 |
| White Pepper | 0.04 | 0.6 |
| Total | 100 | 1500 |

Water and cream were weighed into a beaker. Using an emersion blender, the emulsifier (Lecithin) was dispersed into the water and cream. The dry ingredients were weighed and blended together, by hand. Dry ingredients were slurried into the water and cream mixture. The slurry was then poured into a Thermomix. Sample was brought to a temperature of 190-195° F., by using speed 1, and held at that temperature until a good cook was reached. Good cooks were determined by in process microscopy. Viscosity of room temperature cooks was measured using a Brookfield DV II+ viscometer using the T-bar B attachment at 10 rpm. Viscosity was measured after thirty seconds. Micrographs of cooks at room temperature were obtained following the method for preparing samples for microscopy found in section 4.3.6 Freeze/Thaw Sability Testing.

Sauce samples were evaluated for freeze/thaw, refrigerator, and slow freeze/thaw stability. For freeze/thaw stability, daily cycling evaluations were conducted by looking for syneresis (surface and pressed), gelling, graininess and overall score using a 1 (best) to 15 (worst) scale (see Universal Scale at end of section). Samples were transferred to 2 oz. plastic jars, and prepared in triplicate. The jars were then placed on plastic trays, marked for consistent sample spacing. The trays were placed in the freezer at 20° C. at 4:00 pm for overnight storage. The trays were removed from the freezer at 8:00 am and samples were allowed to thaw on the trays at ambient temperature until 3:00 pm. Samples were evaluated for syneresis (surface and pressed), gelling, graininess and overall score. Evaluations were repeated until desired number of F/T cycles were completed, or until all samples had failed. For refrigerator stability, weekly evaluations were conducted by looking for syneresis (surface and pressed), gelling, graininess and overall score using a 1 (best) to 15 (worst) scale (see Universal Scale at end of section). Samples were transferred to 2 oz. plastic jars, and prepared in triplicate. The jars were then placed on plastic trays, marked for consistent sample spacing. The trays were placed in the refrigerator. Trays were removed from the refrigerator for weekly evaluations. Samples were evaluated for syneresis (surface and pressed), gelling, graininess and overall score. Evaluations were repeated until desired number of F/T cycles were completed, or until all samples had failed. For slow freeze/thaw stability, cycling evaluations were conducted by looking for syneresis (surface and pressed), gelling, graininess and overall score using a 1 (best) to 15 (worst) scale (see Universal Scale at end of section). Samples were transferred to 2 oz. plastic jars, and prepared in triplicate. The jars were then placed in a Styrofoam cooler and placed in the freezer at 20° C. and allowed to freeze for 48 hours. The cooler was removed from the freezer and samples were allowed to thaw in the cooler at ambient temperature for 48 hours. Samples were evaluated for syneresis (surface and pressed), gelling, graininess and overall score. Evaluations were repeated until desired number of FIT cycles were completed or until all samples had failed. Evaluations were performed according to a fifteen point scale, and evaluated for surface syneresis, edge syneresis, gelling and graininess. Scores were provided for each point of evaluation on a scale of 0-15, with 0 being no negative attributes. A sample that has a rating equal to or greater than 9 is considered unacceptable.

Figure 1:
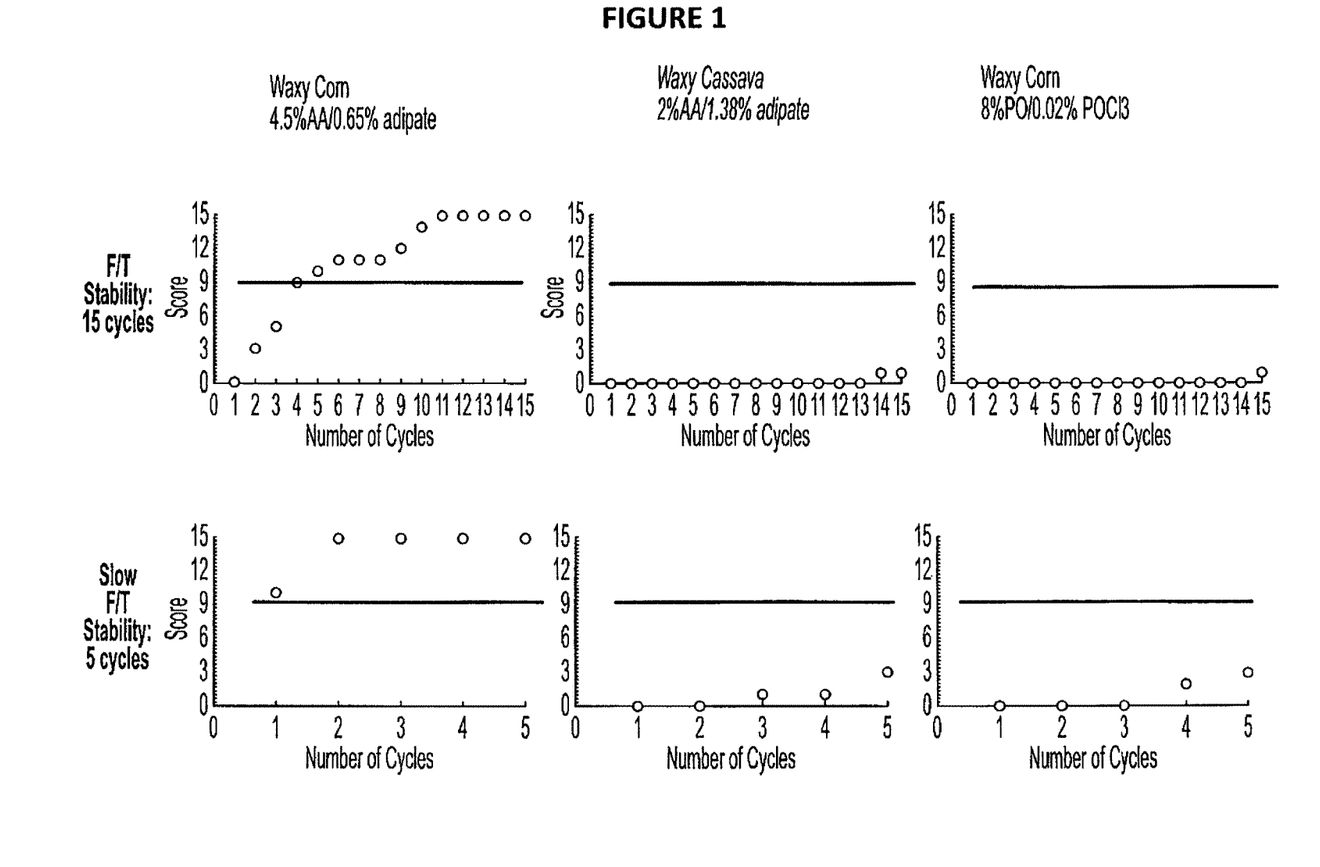
FIG. 1 shows graphs of the scores of the retrogradation stability of a sample of the invention and two comparative samples.

A series of three sauces were made using different starches. A comparative example (5A) was prepared using a waxy corn starch reacted with 4.5 wt % acetic anhydride and 0.65 wt % adipic anhydride. An example of the invention (5B) was prepared using a waxy cassava starch reated with 2 wt % acetic anhydride and 1.35 wt % adipic anhydride. A second comparative example (5C) was prepared using a waxy cassava starch was prepared using a wacy corn starch reacted with 8 wt % propylene oxide and 0.02 wt % phosphorous oxychloride. Samples were evaluated for syneresis, gelling, graininess and an all overall scoring was assessed. In the FIG. 1, a score (indicated by a circle) below nine (shown by the horizontal line) is considered acceptable. A score above the horizontal line is considered unacceptable. Two type of evaluations were complete: a standard freeze thaw evaluation and a slow freeze thaw evaluation often referred to as an accelerated retrogradation stability test.

In this study it has been shown that a sauce made from acetylated distarch adipate waxy corn (Example 5A) is found acceptable up to four cycles in the freeze-thaw stability test and one cycle in the accelerated stability test. The sauce prepared from a similarly modified acetylated distarch adipate waxy cassava (Example 5B) was found to perform in excess of 15 freeze thaw cycles and over five freeze thaw cycles in the accelerated retrogradation stability testing. It is also shown here that the sauce prepared from the acetylated distarch adipate waxy cassava performs comparably to the performance of the highly hydroxypropylated distarch phosphate waxy corn derivative (Example 5C). The textural attributes of the sauces made from the acetylated distarch adipate waxy cassava remained similar to the texture of the highly hydroxypropylated distarch phosphate waxy corn derivative after equivalent freeze thaw cycling.

These findings thus demonstrate to one of ordinary skill in the art, that a gravy for pet food made using acetylated distarch adipate waxy cassava likewise would exhibit long-term storage stability, at ambient temperatures, that is superior to the highly hydroxypropylated distarch phosphate waxy corn derivative.

The above description is for the purpose of teaching the person of ordinary skill in the art how to practice the present invention, and it is not intended to detail all those obvious modifications and variations which will become apparent to the skilled worker upon reading the description. It is intended, however, that all such obvious modifications and variations be included within the scope of the present invention which is defined by the following claims.

What is claimed is:

1. A sterilized composition useful as a pet food comprising a meat based material comprised of meat or meat by-products, and a thickened aqueous phase that is comprised of an acetyl-substituted waxy cassava inhibited starch in an amount of about 1% to about 10% by weight wherein the acetyl-substituted waxy cassava inhibited starch has a degree of bound acetyl of from 0.5% to less than 1.5% by weight wherein the composition was sterilized in a retort process.

2. A composition as claimed in claim 1 wherein the acetyl-substituted waxy cassava inhibited starch is present in the aqueous phase in an amount of about 2% to about 7% by weight.

3. A composition as claimed in claim 1 wherein the aqueous phase survives at least 5 freeze/thaw cycles without gelling wherein a freeze thaw cycle comprises storing a sample in a freezer at 20° C. for 8 hours and thawing the sample at room temperature for 7 hours.

* * * * *